March 4, 1958     A. BENNETT ET AL     2,825,250
KNURLING TOOLS FOR BORE SURFACES
Filed July 27, 1953
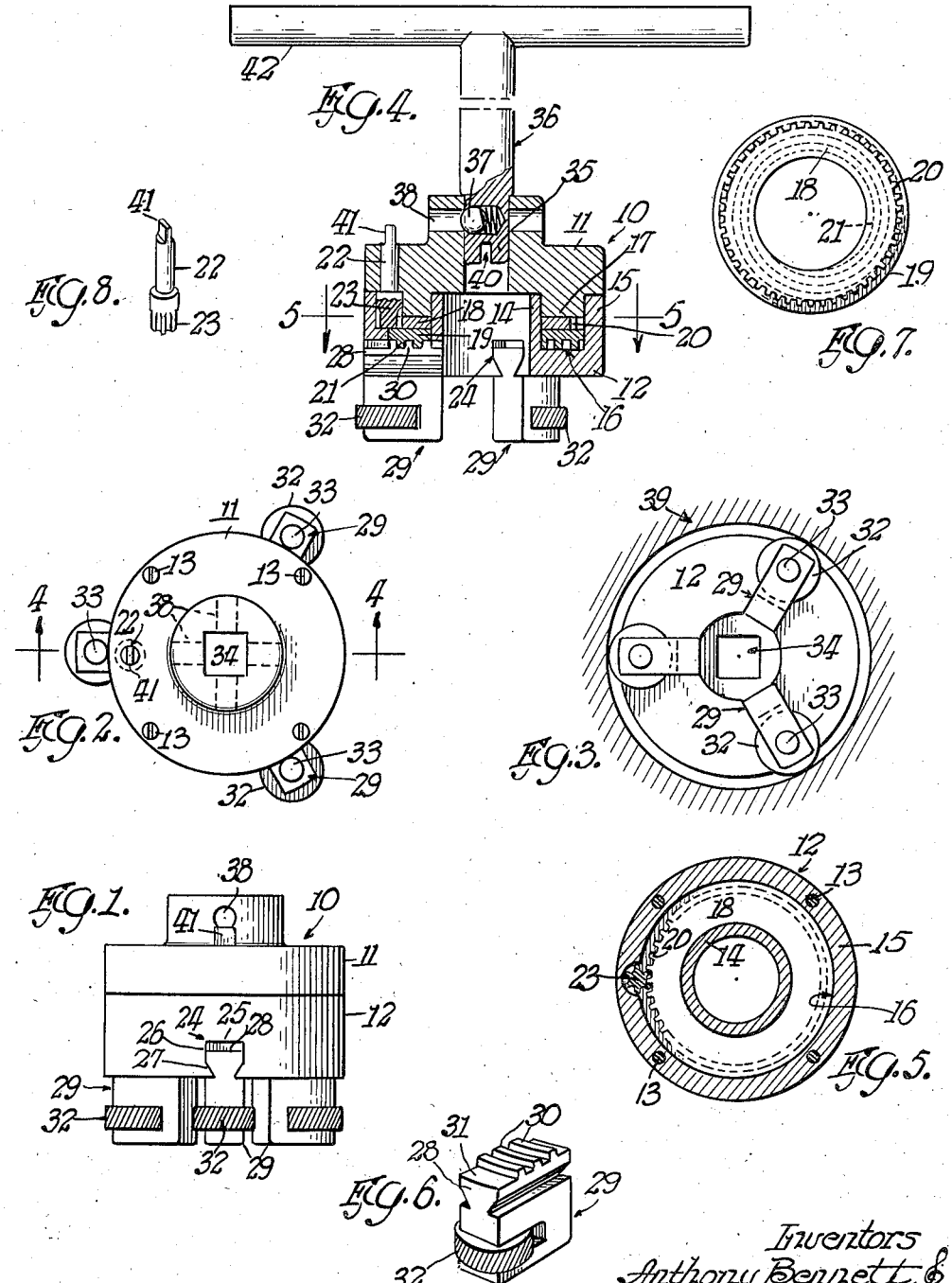
Inventors
Anthony Bennett &
Torris H. Alfreds United States Patent Office 2,825,250
Patented Mar. 4, 1958

2,825,250

KNURLING TOOLS FOR BORE SURFACES

Anthony Bennett, Niles, and Torris H. Alfreds, Park Ridge, Ill., assignors to Porto Knurling Tools, Inc., Chicago, Ill., a corporation of Illinois Application July 27, 1953, Serial No. 370,431

1 Claim. (Cl. 80—5.1)

The invention relates to improvements in knurling tools and it consists in the matters hereinafter illustrated and described and more particularly pointed out in the appended claim.

The invention is more particularly concerned with tools for knurling the surface of a worn bore in a work piece, to "raise" the metal of said surface and provide a better fit to parts, such for example as a bearing, a bushing, or a journal employed in the bore.

One of the objects of the invention is to provide a tool especially adapted for manual operation, in knurling the worn surface of a bore in work piece, and which tool shall be of simple, strong, and rigid construction well adapted to raise the surface of bores of several different diameters.

Another object of the invention is to provide a tool for the purpose mentioned, which tool shall be so constructed that it may be inserted axially into the bore at considerable depths and still be actuated to move the knurling wheels into pressure contact with the surface to be knurled.

Again, it is an object of the invention to provide a knurling tool embodying a tool body insertable into the bore of a work piece to be knurled and adapted to be rotated as a whole within the bore, the tool body carrying a plurality of knurl wheels adapted to have rectilinear guided movement inwardly and outwardly of the axis of rotation of the tool body and in which the means for causing such rectilinear movement shall be operable from one end of the tool, thereby permitting the tool to be inserted into deep bores and yet be properly manipulated.

A still further object of the invention is to provide a tool of the type mentioned wherein the knurl wheel carrying elements shall be arranged for rectilinear movement radially of the body of the tool, by spiral gear tooth means actuatable by means extending parallel with the axis of rotation of the tool body as a whole.

The above mentioned objects of the invention, as well as others, together with the advantages thereof, will more fully appear as the specification proceeds.

In the drawings:

Fig. 1 is a side elevation of the tool as a whole disassociated from the work piece.

Fig. 2 is a top plan view of the tool shown in Fig. 1.

Fig. 3 is a bottom view schematically illustrating the tool positioned within the bore of a work piece, but with the knurl wheels retracted.

Fig. 4 is a sectional view on the line 4—4 of Fig. 2, including a wrench for use with the tool, which wrench is not illustrated in Fig. 2.

Fig. 5 is a sectional view on the line 5—5 of Fig. 4, illustrating certain of the body parts of the tool, but omitting the members which carry the knurl wheels.

Fig. 6 is a perspective view of one of the knurl wheel carrying members.

Fig. 7 is a top plan view of a plate member, which is rotatable within the tool body for causing radial movement of the knurl wheel carrying members, and Fig. 8 is a perspective view of a shaft carrying a gear pinion at its end for use in rotating the plate member illustrated in Fig. 7.

In general the improved tool comprises a tool body 10 consisting of interfitting upper and lower body portions 11 and 12 respectively. These members are removably secured together by means of a plurality of machine screws 13.

The lower member 12 includes a central sleeve-like portion 14 and a surrounding wall portion 15 defining an intermediate annular space 16 into which a depending annular rib 17 of the upper member 11 depends. The depending rib 17 is of less depth than the depth of the space 16. In the space 16 there is accommodated two plate members 18 and 19 which are suitably connected, so that they rotate together. The outer edge of the plate 18 is provided with a gear rack 20 and the under face of the plate 19 is provided with a spiral tooth gear 21.

Mounted in the body of the tool and extending in a direction parallel to the axis of rotation of the tool as a whole, is a shaft member 22, provided at the lower end with a gear pinion 23, which meshes with the teeth 20 of the plate 18.

The lower bottom member 12 is provided with a plurality of radially disposed slots 24, each of which is defined by an upper straight wall portion 25, rightangularly disposed side portions 26—26 and inwardly tapering wall portions 27—27. These radially disposed slots 24, of which there are three in the present instance, are thus designed and adapted slidably to receive the upper portions 28 of the knurl wheel carrying members 29, best shown in Fig. 6.

The members 29, in addition to having the portions 28 adapted to interfit with the aforementioned slots 24, are provided with a plurality of circularly disposed gear teeth 30, on the upper face 31, which are adapted to be engaged by the spirally disposed gear tooth 21 carried on the under side of the plate 19.

The members 29 each carry a knurling wheel 32 which is mounted upon a pivoted pin 33 disposed parallel to the axis of rotation of the tool as a whole. It is believed that the remaining features of the invention will be understood by a brief description of the operation of the tool.

*Operation of the tool*

The tool is provided with a square socket 34 into which the squared end 35 of a wrench 36 is adapted to be inserted. The wrench part 35 carries a spring pressed ball 37 which is adapted to snap into a recess 38 in the tool body. This permits the wrench to be quickly inserted and removed. When in place in the body of the tool, as indicated in Fig. 4, the tool as a whole may be positioned within the work piece 39, as indicated in Fig. 3. At the time the tool is inserted in the work piece the knurl carrying members 29 will be in retracted position. In order to move the members 29 radially outward, the end of the wrench 36 is provided with a slot 40 (see Fig. 4) which, when the wrench is removed from the socket 34, may be used to straddle the flattened end 41 of the shaft 22. By turning the wrench in the proper direction the members 29 may be moved outwardly since the pinion teeth 23 cause rotation of the plates 18 and 19 and spiral teeth 21, by engagement with the teeth 30 of the member 29, cause sliding movement of the members 29 in the slots 24.

When the tool has been positioned properly and the knurling wheels firmly pressed into engagement with the wall of the work piece to be treated, the tool as a whole may be turned by means of a handle 42 of the wrench 36. Thereby powerful leverage may be applied.

Also, because of the spiral gear tooth 21 on the bottom of the plate 19, and the movement by means of the wrench and actuator shaft, powerful leverage can be applied to move the members 29 outwardly, as required to force the knurl wheels 32 into engagement with the metal of the bore so as to upset the same, as required to modify the wall surface of the bore.

From the foregoing description it will be understood that but a single wrench is necessary for the purpose of turning the tool as a whole as for causing rectilinear radial movements of the knurl wheel carrying elements 29. Also, because the shaft member 22 can be engaged from the upper end of the tool, the tool may be inserted into deep bores since the stem of the wrench 36 can extend any desired length into the bore for the purpose of engaging the flattened end 41 of the shaft 22, and also to engage the socket 34 of the body of the tool.

The tool parts are so constructed that they may be rapidly produced at low cost and readily assembled into a strong and efficient tool, well adapted to perform the knurling operations.

Furthermore, the construction is such that the tool may be designed for use in relatively small bores.

We claim:

A portable hand tool for knurling the bore of a workpiece and comprising a tool body insertable into the bore of the workpiece to be knurled and adapted to be rotated within the bore, said tool body comprising a cylindrical member consisting of interfitting upper and lower body portions, said lower body portion consisting of an annular member having a bottom and spaced upstanding cylindrical walls defining an intermediate annular space, a plurality of radially extending guideways in the bottom of said lower body portion, said upper body portion having an actuator socket in one end and an annular rib at the opposite end nesting between said walls in said intermediate annular space, a bar slidably suported in each of said guideways, each bar having longitudinally spaced teeth extending transversely thereon, a knurling wheel rotatably mounted on the outer end of each bar, a plate rotatably mounted in said intermediate annular space and located between said bottom and said rib, said plate having a spiral gear tooth formation thereon in cooperative engagement with the teeth on said bars, and having a circular rack gear on the periphery thereof, whereby rotation of said plate effects longitudinal movement of said bars in the respective guideways, a shaft journalled in said tool body and provided with a pinion on the inner end thereof in mesh with said rack gear, and a handle in driving relation with said actuator socket for manually rotating the tool body.

References Cited in the file of this patent

UNITED STATES PATENTS

| 949,083 | Mossberg | Feb. 15, 1910 |
| 1,365,386 | Djidics | Jan. 11, 1921 |
| 1,371,350 | Campbell | Mar. 15, 1921 |
| 1,473,464 | Church | Nov. 16, 1922 |
| 2,416,774 | Rosenblatt | Mar. 4, 1947 |
| 2,618,182 | Teetor | Nov. 18, 1952 |
| 2,684,604 | Froberg | July 27, 1954 |
| 2,700,325 | Davenport et al. | Jan. 25, 1955 |

FOREIGN PATENTS

| 30,081 | Denmark | Jan. 27, 1921 |
| 360,079 | France | Apr. 12, 1906 |